June 30, 1964  K. C. ALLEN  3,139,612
SCALE

Original Filed June 11, 1954  2 Sheets-Sheet 1

INVENTOR.
KENNETH C. ALLEN
BY
*Marechal, Biebel, French & Bugg*
ATTORNEYS

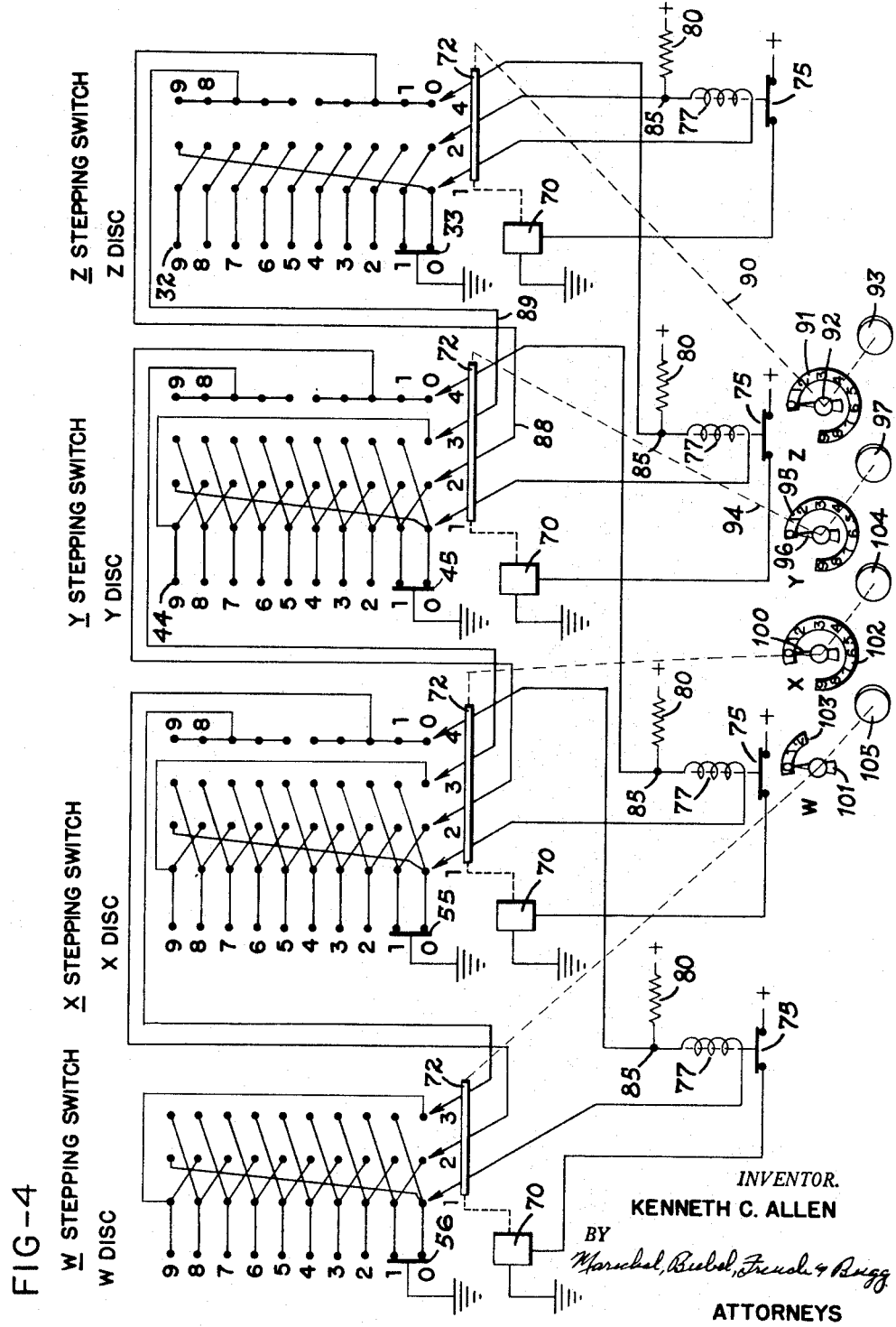

3,139,612
SCALE
Kenneth C. Allen, Dayton, Ohio, assignor to The Hobart
Manufacturing Company, Troy, Ohio, a corporation of
Ohio
Original application June 11, 1954, Ser. No. 436,218, now
Patent No. 2,948,464, dated Aug. 9, 1960. Divided
and this application Dec. 9, 1959, Ser. No. 858,436
7 Claims. (Cl. 340—347)

This invention relates to computing mechanisms and more particularly to such a mechanism employing relays and selector switches.

The invention is of special interest and application in connection with a measuring instrument such as a weighing scale, and provides for furnishing an indication and a record of the weight, the unit price, and the value of the article being weighed. It is further adapted for actuating a recording device or register to provide a tape and a total of a series of such transactions.

It is the principal object of the invention to provide read-out means for sensing and responding digitally to the position of a movable element, such as a shaft which rotates in accordance with the weight of an article for example, thereby furnishing rapidly and accurately a digital reading of each position assumed by the shaft.

It is also an object of the invention to provide a read-out device for accurately reading the position of a series of decade switches which are adapted to be actuated in a continuous cycle in accordance with a variable function, providing an accurate setting of each higher order position on the basis of the position occupied by each lower order element in the system.

Other objects and advantages of the invention will be apparent from the following description, the accompanying drawings and the appended claims.

Referring to the drawings, which illustrate a preferred embodiment of the invention—

FIG. 4 is a diagrammatic view of the weight read-out and stepping switches arranged in accordance with the invention.

*Scale Read-Out*

Figure 1:
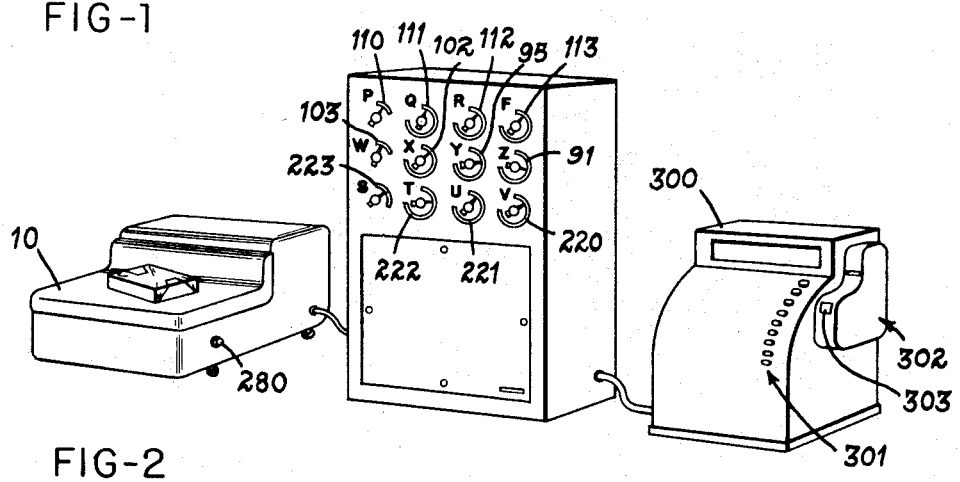
FIG. 1 is a general perspective view of the weighing, computing and registering system in accordance with the present invention.

Reference is made to applicant's copending application Serial No. 376,136, filed August 24, 1953, now Patent No. 2,948,523, which shows a form of power operating scale suitable for use in conjunction with the present invention, and which shows further details of the manner in which such scale may be constructed. Briefly, however, the scale pan 10 (FIG. 1) is supported by weighing mechanism which by any well-known conventional means moves arm 13 a distance proportional to weight, the arm being arranged to actuate an upper contact 14, or a lower contact 15. Any suitable counterbalancing mechanism desired may be used, such mechanism forming no part of the present invention.

Contacts 14 and 15 are both mounted on a bracket 16, and are connected by lines 17 and 18 respectively to a drive motor 20 which is thus caused to rotate selectively forward or backward depending on whether arm 13 closes switch 14 or switch 15. Motor 20 drives worm shaft 21 which rotates worm gear 22 carrying shaft 23 which extends through a nut 24 fixed to the bracket 16. This forms a follow-up system for moving the bracket and the respective switches 14 and 15 so that in response to a displacement of the lever, the motor 20 will be energized in the proper direction, and will continue in operation for sufficient amount of travel to restore the switches 14 and 15 to the neutral position illustrated, at which time the motor will come to rest.

Figure 3:
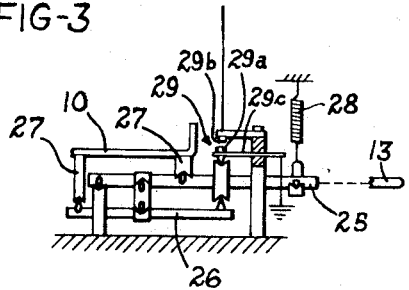
FIG. 3 is a diagrammatic view of a typical weighing mechanism for use in the system of FIG. 1

The operation of the weighing mechanism may be more readily understood from the diagrammatic showing in FIG. 3, wherein the arm 13 is illustrated as an extension of the main lever 25 which is part of a double lever system including a secondary lever 26 and vertical members 27 for supporting the pan or platter 10, and a spring 28 represents the counterbalancing mechanism. FIG. 3 also shows the no-load switch indicated generally at 29 for detecting the presence of a load on the pan 10, this switch including a movable contact 29a cooperating with a fixed contact 29b to form a switch which is open when there is no load on the pan. As shown, the contact 29a is carried on a light spring arm 29c insulated from the scale and of such biasing force that application of a weight to the pan in excess of a predetermined small amount will cause contacts 29a and 29b to close and to remain closed as long as the weight is on the pan.

Figure 2:
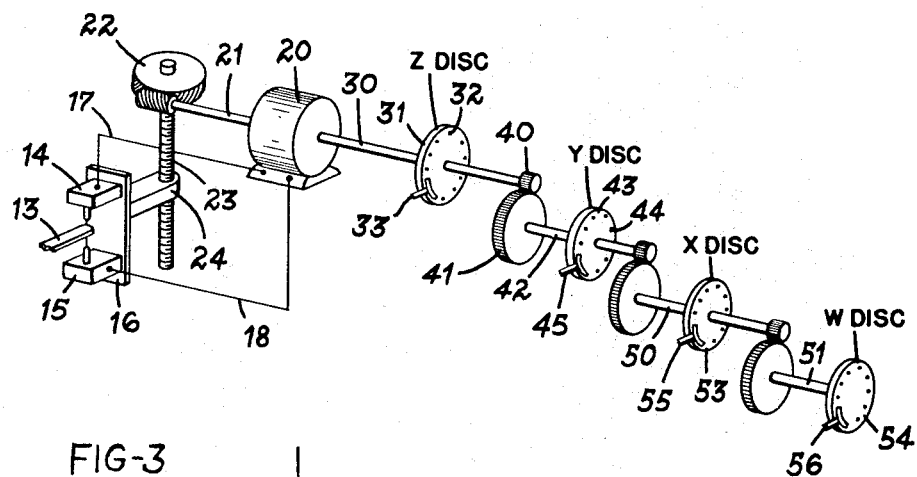
FIG. 2 is a view in perspective of the weight readout mechanism.

Referring again to FIGS. 2 and 3, the lever 25 and arm 13 normally occupy a no-load position corresponding to zero, but when a load is applied to the pan 10, the lever 25 is deflected to a balance position corresponding to the weight of the load. Such deflection of the lever will in turn actuate the appropriate switch 14 or 15 to energize the motor 20 in the direction to drive the shaft 23 until the switches 14 and 15 are again both in neutral position. Since the scale arm 13 moved with the lever 25 to a position corresponding to the weight of the load, the motor shaft 21 will thus turn through an angle directly corresponding to this weight.

In order to transmit an indication of that angle and hence of the weight represented thereby, the shaft 21 is extended as shown at 30, and a disk 31 having a series of ten contacts 32 is associated therewith, such contacts being spaced around its periphery and being used for sensing the position thereof. The drive is preferably such that shaft 30 makes 10 revolutions per pound of weight. A wiper 33 is illustrated which has a width sufficient to span a pair of the disk contacts, such that the wiper 33 may rest either on a single one of contacts 32, or may bridge an adjacent pair thereof. While the disk 31 has been illustrated as rotating and the wiper 33 as stationary, this is intended to be a diagrammatic representation only, and any suitable combination of fixed and movable members may be provided to accomplish the function above described.

Shaft 30 extends through disk 31 and on its extended end carries pinion 40 driving gear 41 in such ratio that the large gear makes one revolution for ten revolutions of shaft 30. Shaft 42 driven by gear 41 carries a contact disk 43 having a series of ten contacts 44 thereon which cooperate with the wiper 45 in the same manner as indicated above with respect to disk 31. Similarly, shafts 50 and 51 are driven at $\frac{1}{10}$ and $\frac{1}{100}$ the speeds respectively of shaft 42 and have contact disks 53, 54 and wipers 55, 56, respectively associated therewith.

For purposes of illustration in connection with an ordinary weighing and computing scale, disk 31 is considered as reading in hundredths of pounds, and hence disks 43, 53 and 54 read in tenths of pounds, in pounds, and in tens of pounds, respectively. For further purposes of analysis, the disk 31 is identified as the Z disk, and disks 43, 53 and 54 as the Y, X and W disks, respectively.

Referring now to FIG. 4, the arrangement of selector switches is shown which provides for sensing or reading out the position of the several disks W, X, Y and Z. A suitable form of selector switch for this and similar purposes throughout this system is a stepping switch, such as a telephone type stepping switch or a rotary selector switch driven by a motor and clutch or other power means. The Z disk 31 is indicated in the upper portion of the drawing with the 10 contacts 32 thereof identified as 0 to 9 respectively, and with the wiper 33 represented as traveling progressively across such contacts, and having a ground connection.

The operating mechanism for the Z selector switch is indicated somewhat diagrammatically at 70, such switches being well known in the art and having an operating coil which steps the contact assembly 72 around with a continuous rotary motion with a series of movements which may be either continuous or step-by-step, bringing it several wipers 1, 2 and 4 into progressive contact with the series of fixed contact points as indicated, the contacts being indicated in a straight line only for simplicity. For purposes of illustration stepping switches operating with a step-by-step movement will be described. When energized, each such stepping switch will continue to operate in an endless cycle until the circuit to its operating mechanism is interrupted at normally closed back contacts 75 of a relay 77. Thus when relay 77 is energized, it opens its back contacts 75, the supply circuit to the stepping switch is broken, and the switch immediately stops. As is well understood in the art, the switch has mechanical means which assures that it will always stop on an even switch closing position. Also, for purposes of simplicity and illustration, the stepping switch Z has been indicated as having a relay 77 which is entirely separate from the corresponding relay for stepping switches W, X and Y whereas in the comprehensive diagram, for purposes of reduction of necessary elements, the same relay is included successively in the control circuit for each of the stepping switches in sequence.

In order to read out the position of the Z disk, only two wipers and two decks of contacts on the Z stepping switch are required, namely, the 1 and 2 wipers. Additional contact decks and wipers are used for other purposes and will be described in connection with their part in the system. It is the function of the Z stepping switch to sense the position of the Z disk, to stop when it reaches a position corresponding to the single contact point which wiper 33 rests upon, and to proceed to the higher such contact where wiper 33 bridges a pair of the Z contacts. This operation may be described as follows.

With wiper 33 engaging only one of the series of its contacts 0–9, stepping switch 70 proceeds to advance its group of wipers until its 2 wiper reaches the position in advance of the contact so engaged. When this occurs a ground is applied to common point 85 of resistor 80, and a current flows from plus to ground, but this has no effect upon the relay 77. The switch continues to the next position at which wiper 1 engages the contact on which the wiper 33 has stopped, with the result that relay 77 is grounded, and a current thus flows therethrough, energizing relay 77, breaking the energizing circuit for the stepping switch, and causing it to come to rest in the position corresponding to that on which wiper 33 has stopped.

Assuming now that wiper 33 bridges contacts 2 and 3 of the Z switch, the operation continues as before, but in addition to the energizing circuit for relay 77, wiper 2 shortcircuits the solenoid when the stepping switch reaches its 2 position. As a result, the stepping switch continues to advance to its 3 position. In this position the solenoid circuit is grounded through wiper 1, while the circuit through wiper 2 is opened and hence the stepping switch comes to rest at the 3 position. Thus the Z stepping switch is caused to hunt until it comes to rest on either the single position corresponding to that occupied by wiper 33 or to the highest of the positions bridged by the wiper.

Referring now to the operation of the remaining stepping switches W, X and Y, all of which are connected and operate in a manner somewhat different from switch Z but similar to each other, the reading out of the higher decade positions involves an accurate determination of whether to stop on the lower or higher position when the switch in the next lower order is close to the 9 or 0 positions. That is, if the Z switch is on its 9 position, and the Y wiper is in a bridging position between 6 and 7, then it is obvious that the Y switch should stop at the 6 position, thereby producing a combined reading of 69. On the other hand if the Z switch stops on the 0 or 1 position with the Y wiper bridging its 6 and 7 contacts, then obviously the Y stepping switch should stop at its 7 position, to furnish a composite reading of 70, or 71, as the case may be. Accordingly the following additional controls are provided for securing this selective read-out, it being understood that each of the W, X and Y switches is connected and functions in a similar manner.

Referring to FIG. 4, the Y switch is shown as having the first deck or series of its contacts connected to the contacts 44 of the disk 43, the second deck being connected to the succeeding and the third deck to the preceding series of contacts, respectively. Switch arm 1 of the Y switch is connected to the relay 77 as before while the 2 switch arm is connected by line 88 to another series or deck of contacts on the preceding stepping switch, namely, the Z stepping switch, in the order as indicated. The lower contacts of this other deck of the Z switch are connected together, that is, from the 0 to the 4 position with the remaining contacts, 5 to 9, are likewise connected together and in turn connected to the 3 switch arm of the Y switch by line 89. The 4 switch arm of the Z switch is connected to the common point between resistor 80 and relay 77 of the Y switch.

In operation, where the wiper 45 stops on a single one of the Y disk contacts, the stepping and hunting operation is the same as described above in connection with the Z switch. Where however the wiper 45 bridges a pair of the Y disk contacts, the system functions as follows.

Assumed that wiper 33 has stopped in the lower portion of its travel so that it is within the range of the 0 to 4 positions with wiper 45 between its 6 and 7 positions. Under these circumstances it is desired to have the Y switch proceed to its 7 position. Accordingly, when the Y switch reaches its 6 position, a ground circuit is established through relay 77 and the 1 wiper of switch Y, but a short circuit is established through the 2 wiper, line 88, the extra deck of contacts of the Z switch and its corresponding wiper 4, and back to common point 85 of the Y switch. The Y switch thus continues in operation until it reaches the 7 position at which time the short circuit is removed and it comes to rest.

Assuming now that the wiper 33 occupies the upper portion of its range in contact with the 5 to 9 set of the Z disk contacts, then it is desired to have the Y switch come to rest when it reaches its 6 position. This is accomplished by the fact that the circuit is grounded through the 1 wiper of the Y switch when it reaches the 6 position, the 2 wiper at this time being open-circuited. If the Y switch should already occupy its 7 position, then it is necessary that it be continued in operation for a full cycle to bring it around to its 6 position. This is effected by the 3 wiper of the Y switch which closes the circuit through line 89, the 4 wiper of the Z switch, and back to the common point 85 of switch Y, shortcircuiting the relay 77 and allowing the Y switch to continue around for practically a full revolution.

It will be understood that switch Z has 1, 2 and 4 decks and wipers but no 3 deck or wiper as there is no switch ahead of it the position of which is to be sensed. Each of switches X and Y has all four decks and wipers while switch W has decks 1, 2 and 3 but not 4.

FIG. 4 also indicates a connection 90 from the moving contact assembly 72 of the Z switch to an indicator having dial 91 with a pointer 92 moving thereover to provide an indication of the hundredths of pounds position in the weighing operation. Such connection is also extended to effect corresponding setting of a type wheel 93 forming part of the ticket printer and where a register is used, may similarly be connected thereto.

Stepping switch Y has a connection 94 from its movable contact assembly to indicator dial 95 and pointer 96, as well as to type wheel 97. Similarly stepping switches X and W actuate pointers 100 and 101 on dials 102 and 103, and set type wheels 104 and 105 respectively providing for reading, indicating and printing the pounds and tens of pounds respectively. In this way a complete visual and printed record of the weight read-out is provided in four decimal places.

The several dials and pointers associated with the read-out means of the invention are shown in FIG. 1 as incorporated in a cabinet which also houses additional dials 110–113 and 220–223, and these dials are actuated to show unit price and computed value through the operation of the computing system described in detail in my copending application Serial No. 436,218, filed June 11, 1954, now Patent No. 2,948,464, of which the present application is a division. FIG. 1 also shows the mechanism in this cabinet as coupled with a typical register indicated at 300 for obtaining totals and subtotals with respect to the operation of the system as desired.

Reference herein to a wire, contact, circuit or the like as being grounded or energized is intended to include both conditions, as well as both polarities, since it is the means by which a particular wire is selected or conditioned so that it will be found by the stepping switch, the particular condition employed being determined in relation to the circuit conditions disclosed.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A read-out device for converting the position of a movable element into a digital representation comprising a series of spaced contacts indicative of the positions of zero through nine, a bridging member having contact bridging portions electrically connected in common movable relative to said series of contacts in accordance with the position of said element with said portions capable of contacting a single one of said contacts or of bridging an adjacent pair of said contacts, a selector switch having multiple series of contacts connected respectively to said series of spaced contacts, drive means for advancing said selector switch through a series of positions, means including one of said contact series for stopping said advancing movement of said selector switch when it reaches the position corresponding to a single contact at which said bridging member has stopped, and additional means including another of said contact series operable in response to the bridging of a pair of said spaced contacts for stopping said selector switch only in the position corresponding to the higher contact in the series of the pair bridged by said bridging member portions.

2. A read-out device for converting the position of a movable element into a digital representation comprising a series of spaced contacts, a bridging member having contact bridging portions electrically connected in common movable relative to said series of contacts in direction relation to the movement of said element and adapted to contact a single one or to bridge a pair of adjacent contacts of said series, a power driven selector switch having two series of contacts connected respectively to said series of spaced contacts, drive means for advancing said selector switch through a series of positions, control means including one of said contact series for stopping the advancing movement of said selector switch in response to its arrival at the contact corresponding to the position of said bridging member where said bridging member is in contact with only a single one of said series of spaced contacts, and further control means including the other of said spaced contact series for stopping the advancing movement of said selector switch in response to its arrival at the second of the pair of spaced contacts where said bridging member portions are in contact with a pair of said series of spaced contacts.

3. A read-out device for converting the position of a lower order and a higher order movable element having a predetermined proportional rate of rotation with respect to each other into a digital representation comprising a series of spaced contacts associated with each of said movable elements, a bridging member having contact bridging portions electrically connected in common for each said series of contacts movable relative thereto in accordance with the positions of said movable elements respectively and adapted to contact a single contact or to bridge a pair of adjacent contacts in each series, a lower order selector switch having a series of switch contacts connected respectively to the series of spaced contacts associated with said lower order movable element, a higher order selector switch also having a series of switch contacts connected respectively to said series of spaced contacts associated with said higher order movable element, drive means for advancing each said selector switches through a series of positions, means for stopping the advancing movement of said higher order selector switch when it reaches its contact position corresponding to the position occupied by said higher order bridging member when said higher order bridging member portions close a circuit to a single one of its contacts, and means controlled in accordance with the position of said bridging member associated with said lower order selector switch for selectively controlling the operation of said higher order selector switch drive means to provide proper stopping of said higher order switch to produce a digital representation correctly corresponding to the position of said movable elements.

4. A read-out device for converting the position of a lower order and a higher order movable element having a predetermined proportional rate of rotation with respect to each other into a digital representation comprising a series of spaced contacts associated with each of said movable elements, lower and higher bridging members for said series of contacts movable relative thereto in accordance with the position of said movable elements respectively and each said members having electrically common bridging portions adapted to contact a single contact or to bridge a plurality of the contacts in each series, a lower order selector switch movable through a cycle relative to a series of contacts connected respectively to the series of spaced contacts associated with said lower order movable element, a higher order selector switch having a series of contacts connected respectively to said series of spaced contacts associated with said higher order movable element, drive means for advancing each said selector switch, and control means for said higher order selector switch drive means responsive to the position of said lower order selector switch when near the end of its cycle for stopping said higher order selector switch when it arrives at the position corresponding to the first contact of the pair bridged by said higher order bridging member.

5. A read-out device for converting the position of a lower order and a higher order movable element having a predetermined proportional rate of rotation with respect to each other into a digital representation comprising a series of spaced contacts associated with each of said movable elements, lower and higher bridging members for said series of contacts movable relative thereto in accordance with the position of said movable elements respectively and each said members having electrically common bridging portions adapted to contact a single contact or to bridge a plurality of adjacent contacts in each series, a lower order selector switch movable through a cycle relative to a series of contacts connected respectively to the series of spaced contacts associated with said lower order movable element, a higher order selector switch having a series of contacts connected respectively to said series of spaced contacts associated with said higher order movable element, drive means for advancing each said selector switch, and control means for said higher order selector switch drive means responsive to the position of the lower order selector switch when near the beginning of its cycle for stopping the operation of said higher order selector switch when said higher order selector switch arrives at the position corresponding to the second contact of the pair bridged by said higher order bridging member.

6. A read-out device for converting the position of a lower order and a higher order movable element having a predetermined proportional rate of rotation with respect to each other into a digital representation, comprising a series of spaced contacts associated with each of said movable elements, lower and higher order bridging members for said series of contacts movable relative thereto in accordance with the position of said movable elements respectively and each having electrically common bridging portions adapted to contact a single contact or to bridge a plurality of contacts in each series, a lower order selector switch movable through a cycle relative to a series of contacts connected respectively to the series of spaced contacts associated with said lower order movable element, a higher order selector switch having a series of contacts connected respectively to said series of spaced contacts associated with said higher order movable element, drive means for advancing each said selector switch, means responsive to the position of said lower order selector switch when near the end of its cycle for stopping said higher order selector switch when it arrives at the position corresponding to the first contact of the pair bridged by said higher order bridging member, and means for continuing the operation of said higher order selector switch through another cycle where said higher order selector switch occupies a position corresponding to the second contact of the pair bridged by said higher order bridging member when said lower order selector switch occupies a position near the end of its cycle.

7. A read-out device for converting the position of a lower order and a higher order movable element having a predetermined proportional rate of rotation with respect to each other into a digital representation comprising a series of spaced contacts associated with each of said movable elements, lower and higher order contact members for said series of contacts movable relative thereto in accordance with the positions of said movable elements respectively, each of said contact members having electrically common contact bridging portions being arranged to traverse its respective series of spaced contacts to provide a connection thereto corresponding to the position of its associated movable element, means for causing said higher order contact member to be connected to the lower of two adjacent bridged contacts when the lower order member is in the upper portion of its range of positions, and means for causing said higher order member to be connected to the higher of two adjacent bridged contacts when the lower order member is in the lower portion of its range of positions.

References Cited in the file of this patent
UNITED STATES PATENTS

| | | |
|---|---|---|
| 2,666,912 | Gow et al. | Jan. 19, 1954 |
| 2,750,584 | Goldfischer | June 12, 1956 |
| 2,809,369 | Feeney et al. | Oct. 8, 1957 |
| 2,813,677 | Scarbrough | Nov. 19, 1957 |
| 2,867,796 | Kendall | Jan. 6, 1959 |
| 2,944,808 | Spademan | July 12, 1960 |
| 2,948,523 | Allen | Aug. 9, 1960 |